(12) United States Patent
Wong et al.

(10) Patent No.: US 9,474,049 B2
(45) Date of Patent: Oct. 18, 2016

(54) UPLINK TRANSMISSION

(71) Applicant: Alcatel Lucent, Boulogne Billancourt (FR)

(72) Inventors: Shin Horng Wong, Swindon (GB); Vikas Dhingra, Bangalore (IN)

(73) Assignee: Alcatel Lucent, Boulogne-Billancourt (FR)

( * ) Notice: Subject to any disclaimer, the term of this patent is extended or adjusted under 35 U.S.C. 154(b) by 157 days.

(21) Appl. No.: 14/373,203

(22) PCT Filed: Jan. 11, 2013

(86) PCT No.: PCT/EP2013/000080
§ 371 (c)(1),
(2) Date: Jul. 18, 2014

(87) PCT Pub. No.: WO2013/107623
PCT Pub. Date: Jul. 25, 2013

(65) Prior Publication Data
US 2014/0376475 A1  Dec. 25, 2014

(30) Foreign Application Priority Data
Jan. 20, 2012  (EP) .................................. 12360003

(51) Int. Cl.
H04W 4/00  (2009.01)
H04W 72/04  (2009.01)
H04W 74/08  (2009.01)

(52) U.S. Cl.
CPC ......... *H04W 72/04* (2013.01); *H04W 74/0833* (2013.01); *H04W 74/0866* (2013.01)

(58) Field of Classification Search
None
See application file for complete search history.

(56) References Cited

U.S. PATENT DOCUMENTS

| | | | |
|---|---|---|---|
| 8,989,117 B2* | 3/2015 | Ramos et al. | 370/329 |
| 2013/0039237 A1* | 2/2013 | Kubota et al. | 370/311 |
| 2013/0039354 A1* | 2/2013 | Martin et al. | 370/338 |
| 2013/0170444 A1* | 7/2013 | Pani et al. | 370/329 |
| 2013/0208668 A1* | 8/2013 | Ramos et al. | 370/329 |
| 2014/0044108 A1* | 2/2014 | Earnshaw et al. | 370/336 |

OTHER PUBLICATIONS

Alcatel-Lucent et al., "Discussion on PRACH fallback for enhanced CELL-FACH," 3rd Generation Partnership Project (3GPP), 3GPP TSG-RAN WG2 Meeting #76, R2-115867, 3 pages, XP050564160, San Francisco, USA, Nov. 14-18, 2011.

(Continued)

*Primary Examiner* — Steven H Nguyen
(74) *Attorney, Agent, or Firm* — Fay Sharpe, LLP

(57) ABSTRACT

A method of controlling uplink transmission on an acquired common channel by user equipment in a wireless communications network. User equipment and a computer program product operable to perform that method. The method comprises: determining a predetermined acquired common channel retention period; requesting allocation of common network resource for an uplink transmission; receiving an indication of an allocated acquired common channel; assessing whether said uplink transmission meets uplink criteria for said allocated acquired common channel and, if said uplink criteria are met, transmitting said uplink transmission on said allocated acquired common channel within said common channel retention period. Aspects allow common channels in a network to be used by user equipment if it is determined that a pending uplink transmission is suitable for transmission on an allocated common channel.

20 Claims, 3 Drawing Sheets

RACH Fallback with restriction to perform only legacy
PRACH preamble

(56) References Cited

OTHER PUBLICATIONS

ZTE, "Consideration on optimizing usage of UL common resources," $3^{rd}$ Generation Partnership Project (3GPP), 3GPP TSG-RAN WG2 Meeting #75bis, R2-114907, 4 pages, XP050541121, Zhuhai, China, Oct. 10-14, 2011.

Qualcomm Incorporated, "On the complexity aspects of Fallback to R99," $3^{rd}$ Generation Partnership Project (3GPP), 3GPP TSG RAN WG2 Meeting #76, R2-115959, 3 pages, XP050564378, San Francisco, US, Nov. 14-18, 2011.

Skeleton report, $3^{rd}$ Generation Partnership Project (3GPP), 3GPP TSG RAN WG2 Meeting #75bis, R2-11xxxx, pp. 1-48, XP050541269, Zhuhai, China, Oct. 10-14, 2011.

Huawei et al., "Solution of Fallback to R99 PRACH," $3^{rd}$ Generation Partnership Project (3GPP), 3GPP TSG-RAN WG1 Meeting #66, R1-112188, pp. 1-3, XP050537351, Athens, Greece, Aug. 22-26, 2011.

Ericsson et al., "Fallback for to R99 RACH," $3^{rd}$ Generation Partnership Project (3GPP), 3GPP TSG-RAN WG2 Meeting #74, R2-113325, pp. 1-2, XP050495439, Barcelona, Spain, May 9-13, 2011.

International Search Report for PCT/EP2013/000080 dated Mar. 5, 2013.

PCT Pat. App. No. PCT/EP2013/000080, Written Opinion of the International Searching Authority, mailed Mar. 5, 2013, 8 pp.

European Pat. App. No. 12360003.3, Extended European Search Report, mailed Jun. 27, 2012, 9 pp.

\* cited by examiner

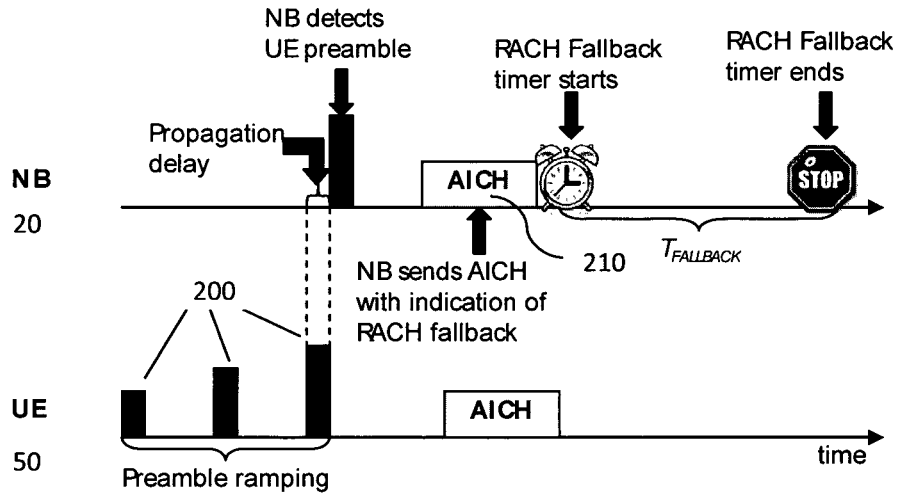
Figure 2: RACH fallback timer
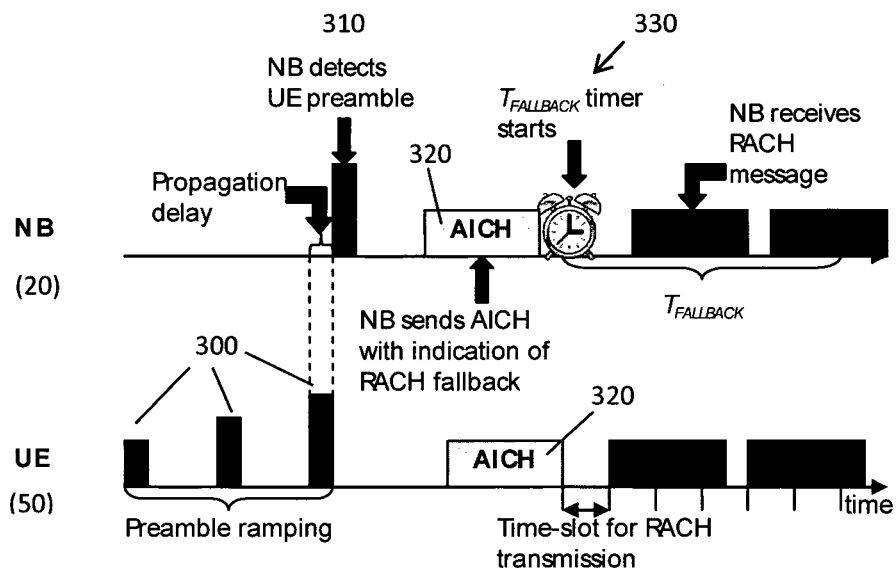
Figure 3: Example RACH Fallback

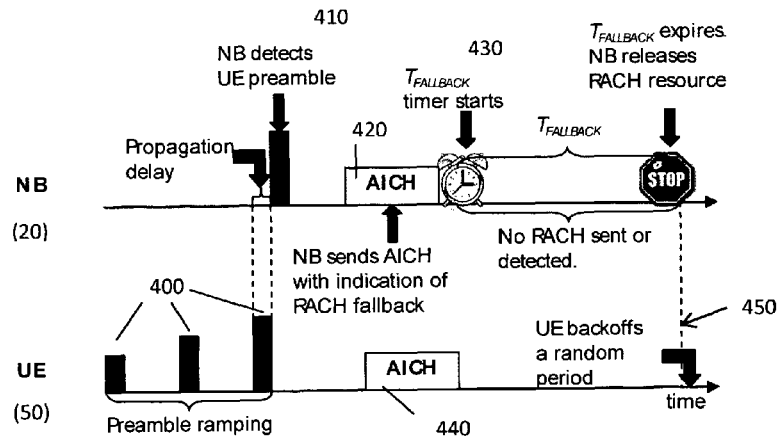
Figure 4: RACH Fallback without UE transmission
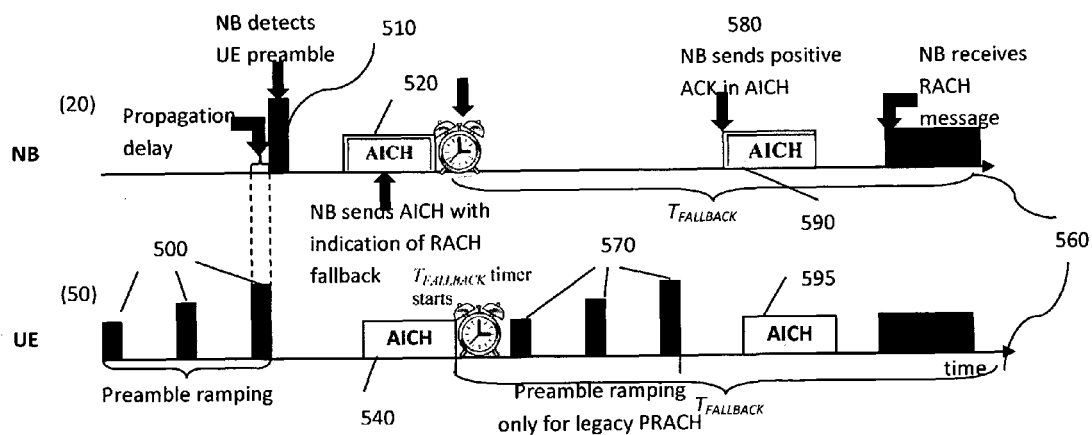
Figure 5: RACH Fallback with restriction to perform only legacy PRACH preamble

# UPLINK TRANSMISSION

FIELD OF THE INVENTION

The present invention relates to a method of controlling uplink transmission on an acquired common channel by user equipment in a wireless communications network, a computer program product and user equipment operable to perform that method, a method of allocating a common channel for uplink transmission by user equipment in a wireless communications network and a computer program product and network control node operable to perform that method.

BACKGROUND

User equipment may operate in various modes in, for example, a UMTS telecommunications network. On initial turning on of user equipment in the cell, it will typically operate in "idle mode". Once it synchronises and attaches itself to a base station, it gains radio resource control (RRC) connection and is referred to as being in connected mode. User equipment in idle mode does not have a radio resource control connection. If user equipment is RRC connected it can be in one of five different RRC states: Cell_DCH, Cell_FACH, enhanced Cell_FACH, Cell_PCH, or URA_PCH states.

User equipment typically moves into Cell_DCH state when its data traffic is high. In a Cell_DCH state, the user equipment is allocated a dedicated channel on which to transmit and receive data from a base station. In a network operating according to typical UMTS architecture, user equipment can be in a Cell_DCH state when it is expected to have a high volume of traffic. Operation in a Cell_DCH state is typically highly demanding of battery power It will be appreciated that for data traffic which is particularly bursty in nature, operation in a full Cell_DCH state can be particularly wasteful of battery at user equipment and also of available radio resource. Thus, the ability to handle bursty traffic without entering a more dedicated state is beneficial to overall network operation.

The widespread popularity of "smartphones" in commercial networks has led to a change in typical data traffic profile carried within a network. The loading of Web pages and subsequent user reading, for example, has led to a data traffic profile which has become substantially discontinuous or bursty and traditional communication link establishment techniques and transfer techniques designed primarily for continuous data transmission may not offer a particularly efficient or prompt means to handle bursty traffic.

User equipment may be operable, when not in a Cell_DCH state, to use a random access channel (RACH) on the uplink and a base station will operate to communicate with user equipment using a forward access channel (FACH). RACH and FACH have a small data carrying ability and in WCDMA or UMTS systems it is possible for user equipment and base stations to operate and communicate data traffic therebetween using shared or common resources on downlink and uplink when user equipment is operating in non-Cell_DCH RRC states.

Those non-Cell_DCH states typically use common channels, and thus there is limited resource available within a cell to support communication between user equipment and a base station on those shared channels. Aspects described herein offer methods of utilising available common channels to allow signalling and data traffic transfer without utilising a full Cell_DCH RRC state.

SUMMARY

Accordingly, a first aspect provides a method of controlling uplink transmission on an acquired common channel by user equipment in a wireless communications network, the method comprising:

determining a predetermined acquired common channel retention period;

requesting allocation of common network resource for an uplink transmission;

receiving an indication of an allocated acquired common channel;

assessing whether the uplink transmission meets uplink criteria for the allocated acquired common channel and, if the uplink criteria are met, transmitting the uplink transmission on the allocated acquired common channel within the common channel retention period.

Accordingly, the first aspect recognises that when user equipment acts to compete with other user equipment to try and obtain a common channel on which to make an uplink transmission, it may obtain a common channel. That acquired common channel may, or may not, be of the type it requested and thus the uplink transmission may be unsuited to immediate transmission on the allocated common channel and some reconfiguration may be required. Such reconfiguration takes time and, by allowing the user equipment a common channel retention period, that reconfiguration may take place without the need to compete again for allocation of a common channel.

The first aspect further recognises that not all uplink transmissions may be suited to the allocated common channel. The first aspect may have particular application in the event user equipment requests a common E-DCH channel for transmission of data, and whilst there is no common e-DCH channel, the network may determine that a RACH channel is available for transmission.

For example, a RACH message typically comprises a single "RACH message part" packet of data. The uplink transmission may not fit into such a single RACH message and thus the allocated channel may be unsuitable for transmission of the uplink transmission which user equipment may wish to make. Thus the user equipment is operable to make the assessment of whether the allocated channel is suitable for the particular uplink transmission. For example, some user equipment in a network may be capable of using a RACH (Random Access Channel) for uplink transmission. That is typically true for user equipment which are not operable to perform HSUPA in an enhanced Cell_FACH state. Other user equipment, having the ability to perform HSUPA in an enhanced Cell_FACH state, may be restricted so that they may only use common E-DCH channels to perform their uplink transmissions when in a non Cell_DCH state. As it is expected in the future for more user equipment to utilise the ability to transmit and receive bursty data using enhanced Cell_FACH, it is likely that the limited number of common E-DCH channels within a network will offer a restriction to network operation and that those shared channels may get congested during busy periods having heavy traffic within the network.

Some user equipment may be operable to operate in an enhanced Cell_FACH manner such that user equipment supporting HSUPA in an enhanced Cell_FACH state may be allowed to use RACH, thereby offering a chance to a base"

station to free up common E-DCH resources if the network is experiencing data traffic congestion on those resources.

If a user equipment using common E-DCH resource is released explicitly by a base station or node B, or implicitly released by a failure of a radio link, that user equipment may be left with residual RLC (Radio Link Control) packets formatted for transmission on an E-DCH channel in the user equipment buffer. Furthermore, there may be packets for HARQ retransmission at the user equipment. In the event that the user equipment is operable to fall back to transmit on a RACH channel, such residual packets will typically need to be regenerated to a format that can be used for RACH transmission. Such regeneration may lead to complexity of operation at user equipment. Furthermore, residual packets in a HARQ buffer may simply be lost. The user equipment may contain data in its buffer which is too large to be served in a single RACH channel. Embodiments and aspects described herein address some issues with such user equipment and aim to reduce complexity and issues in relation to residual packets and user equipment buffer status in the event of fall-back from use of an E-DCH resource to a RACH channel.

Aspects described allow the setting of a timer for user equipment to fall back to transmission using a RACH channel. During a timer period, user equipment may be operable to send a message using a RACH transport channel. Once the timer expires, RACH resource is released and the user equipment is not operable to fall back or send messages using the RACH transport channel. Such a method aims to ensure that user equipment has time to regenerate RLC packets if required. As a result, user equipment computational complexity may be reduced, since the regeneration need not necessarily occur in a time-critical manner. The user equipment, according to such a method, may be operable to decide not to use a RACH channel if it determines that RACH is unlikely to be a suitable transport channel for traffic in its buffer. For example, the user equipment buffer may be particularly large and filled, or user equipment may have residual packets which may not be successfully regenerated and, thus, utilisation of a RACH channel for transmission may prove unsuitable. In such a scenario, the user equipment may be operable to simply time out and not transmit anything until expiry of the timer and, thus, the RACH resource may be reused by other user equipment in a cell. The method also ensures that a base station is aware that a user equipment may be operable to have switched from transmission on an E-DCH channel to a RACH channel and, thus, the base station may be operable to expect a RACH transmission within a particular time period after cessation of transmissions on an E-DCH channel from user equipment.

In one embodiment, if the uplink criteria are not met, making no uplink transmission within the common channel retention period. Accordingly, although the channel is retained, if user equipment determines that the allocated channel is unsuited to the uplink transmission, no transmission is made.

In one embodiment, the common channel retention period is predetermined to be of a duration of more than one acquired common channel transmit time interval. Accordingly, user equipment may be given sufficient time to reconfigure an uplink transmission. In some cases, dependent upon the allocated retention period, the user equipment may be operable to make more than one transmission within the retention period. The duration of the timer retention period is selected to balance user equipment response time and change to a propagation channel. It will be appreciated, for example, that the transmit power determined via preamble ramping may not be applicable by the time the timer expires if the retention period is selected to be too long. The retention period may, therefore, be configurable.

In one embodiment, the transmission on the allocated acquired common channel occurs within preselected transmit time intervals within the acquired common channel retention period. Accordingly, a base station may be expecting uplink transmissions having a particular format from user equipment in those time intervals. In one embodiment, the preselected transmit time intervals are selected in relation to uplink access slots used by the user equipment to transmit preamble signalling.

In one embodiment, the uplink transmission occurs a plurality of times within the acquired common channel retention period. Accordingly, for example, if the uplink transmission is too large for a single RACH message, the transmission may be reformatted for transmission across a plurality of RACH messages across the duration of the retention period.

In one embodiment, requesting allocation of common network resource comprises requesting allocation of an E-DCH channel. Accordingly, user equipment typically uses a signature to request a common channel. Those signatures may be partitioned or indexed such that choice of a signature in a request may be indicative of the nature of uplink transmission. Furthermore there may be an index link or predetermined relationship between common channels of different types associated with a particular signature.

In one embodiment, the acquired common retention channel comprises an allocated Random Access Channel (RACH). Accordingly, although user equipment may request an E-DCH channel, a base station may determine that no common E-DCH channels are available and instead allocate a RACH channel.

In one embodiment, the method further comprises: reformatting the uplink transmission during the common channel retention period for transmission on the acquired common channel. Accordingly, user equipment uplink transmissions which are formatted for transmission on an E-DCH channel may be reformatted for transmission on a RACH channel.

In one embodiment, determining the retention period comprises receiving a broadcast message including an indication of the retention period. It will be appreciated that the retention period may be hard coded at user equipment, or may be determined by the network and signalled to the user equipment.

In one embodiment, determining the retention period comprises receiving a message comprising an indication of the retention period. The retention period may be indicated to user equipment at the same time as allocation of a common channel, or may be transmitted, for example, as a system information broadcast message in a cell.

In one embodiment, the method further comprises receiving an indication of the uplink criteria for said allocated acquired common channel. Accordingly, the criteria may be hard coded at user equipment, and may be determined only by assessments which occur at user equipment. Alternatively, one or more criteria may be set by the network and signalled to user equipment, either at the same time as common channel allocation or by means of a broadcast message.

In one embodiment, the uplink criteria for the allocated acquired common channel comprises an indication of a threshold user equipment buffer size for the uplink transmission. It will be appreciated that any similar measurable characteristic for suitability of uplink transmission may be used as a threshold.

In one embodiment, if the uplink criteria are not met, the method further comprises making no uplink transmission within the common channel retention period, and awaiting expiry of the common channel retention period before re-requesting allocation of common network resource for an uplink transmission. Accordingly, the user equipment waits, at congested times, before re-requesting common resource, thus increasing the likelihood that such resource may be available.

In one embodiment, the method further comprises: monitoring, during the common channel retention period, for an indication of unavailability of the allocated acquired common channel and, if received, making no uplink transmission on the allocated acquired common channel within the common channel retention period. If the network determines that the cell is congested and transmission from another user equipment is to take priority, it may issue a retraction of a common channel allocation.

In one embodiment, requesting allocation of common network resource for uplink transmission comprises indicating a preferred common network resource channel. That indication may comprise an indication of channel signature. In one embodiment, the indication of preferred common network resource channel comprises an indication of requested channel type. For example, the signature may map to an E-DCH channel.

In one embodiment, the method further comprises:

requesting allocation of common network resource for uplink transmission including an indication of a preferred common network resource channel during the common channel retention period if the uplink criteria are not met. Accordingly, if user equipment requested, and failed to receive, a common E-DCH channel, it may pretend to emulate legacy user equipment, since the RACH or common E-DCH channels may be partitioned and the legacy user equipment allocation may not be as congested as its usual pool of common channels.

If the user equipment receives an indication to use a RACH channel during the retention period, it may be restricted, according to some embodiments, to only request RACH channel allocation until expiry of a retention period timer.

A second aspect provides a computer program product operable, when executed on a computer, to perform the method of the first aspect.

A third aspect provides user equipment operable to control uplink transmission on an acquired common channel in a wireless communications network, the user equipment comprising:

retention period determination logic operable to determine a predetermined acquired common channel retention period;

resource request logic operable to request allocation of common network resource for an uplink transmission;

reception logic operable to receive an indication of an allocated acquired common channel;

transmission assessment logic operable to assess whether the uplink transmission meets uplink criteria for the allocated acquired common channel and, if the uplink criteria are met, to transmit the uplink transmission on the allocated acquired common channel within the common channel retention period.

In one embodiment, if the uplink criteria are not met, the transmission assessment logic makes no uplink transmission within the common channel retention period.

In one embodiment, the common channel retention period is predetermined to be of a duration of more than one acquired common channel transmit time interval.

In one embodiment, the transmission assessment logic is operable to transmit on the allocated acquired common channel within preselected transmit time intervals within the acquired common channel retention period.

In one embodiment, the preselected transmit time intervals are selected in relation to uplink access slots used by the user equipment to transmit preamble signalling.

In one embodiment, the transmission assessment logic is operable to make the uplink transmission a plurality of times within the acquired common channel retention period.

In one embodiment, the request logic is operable to request allocation of common network resource by requesting allocation of an E-DCH channel.

In one embodiment, the acquired common retention channel comprises an allocated Random Access Channel (RACH).

In one embodiment, the user equipment further comprises reformatting logic operable to reformat the uplink transmission during the common channel retention period for transmission on the acquired common channel.

In one embodiment, the user equipment is operable to determine the retention period by receiving a broadcast message including an indication of the retention period.

In one embodiment, the user equipment is operable to determine the retention period by receiving a message comprising an indication of the retention period.

In one embodiment, the user equipment further comprises uplink criteria logic operable to receive an indication of the uplink criteria for the allocated acquired common channel.

In one embodiment, the uplink criteria for the allocated acquired common channel comprises an indication of a threshold user equipment buffer size for the uplink transmission.

In one embodiment, if the said uplink criteria are not met, the transmission assessment logic is operable to make no uplink transmission within the common channel retention period, and await expiry of the common channel retention period before the resource request logic re-requests allocation of common network resource for an uplink transmission.

In one embodiment, the user equipment further comprises monitoring logic operable to monitor, during the common channel retention period, for an indication of unavailability of the allocated acquired common channel and, if received, the user equipment transmission assessment logic is operable make no uplink transmission on the allocated acquired common channel within the common channel retention period.

In one embodiment, the resource request logic is operable to request allocation of common network resource for uplink transmission by indicating a preferred common network resource channel.

In one embodiment, the indication of preferred common network resource channel comprises an indication of requested channel type.

In one embodiment, the resource request logic is operable to request allocation of common network resource for uplink transmission including an indication of a preferred common network resource channel during the common channel retention period if the uplink criteria are not met.

A fourth aspect provides a method of allocating a common channel for uplink transmission by user equipment in a wireless communications network, the method comprising:
determining a predetermined acquired common channel retention period; receiving a request for allocation of common network resource for an uplink transmission by the user equipment;
assessing available common network resource and allocating an available common channel to the user equipment for the predetermined acquired common channel retention period; and
transmitting an indication of the allocated acquired common channel to the user equipment.

The fifth aspect recognises that a control node, for example, a base station or RNC, may be operable to allocate a common channel for a predetermined retention period. If it allocates a common channel to user equipment for a period of time, it is unable to reallocate the common channel to other user equipment until a timer, which keeps track of the predetermined retention period, expires.

In one embodiment, the method further comprises: determining preselected uplink transmit time intervals for uplink transmission on the allocated acquired common channel and transmitting an indication of the preselected uplink transmit time intervals to the user equipment. Accordingly, it may expect to receive transmissions having a particular format from user equipment in those time intervals or time slots.

In one embodiment, the method further comprises: reassessing available common network resource within the predetermined acquired common channel retention period; determining that the allocated common channel is no longer available to the user equipment for the predetermined acquired common channel retention period; and transmitting an indication of unavailability of the allocated acquired common channel to the user equipment. The control node typically has visibility of network and cell traffic and thus can retract an allocation if it determines that the channel is required by another user.

In one embodiment, the indication of unavailability comprises an indication of an alternative allocated acquired common channel. The control node may indicate, in a retraction message, that an alternative channel is available. The user equipment may be allocated that alternative channel for a retention period, and may use it for transmissions if it determines the new channel is suitable for data in its uplink buffer.

A fifth aspect provides a computer program product operable, when executed on a computer, to perform the method of the fourth aspect.

A sixth aspect provides a network control node operable to allocate a common channel for uplink transmission to user equipment in a wireless communications network, the node comprising:
retention period logic operable to determine a predetermined acquired common channel retention period;
request logic operable to receive a request for allocation of common network resource for an uplink transmission by the user equipment;
resource assessment logic operable to assess available common network resource and allocate an available common channel to the user equipment for the predetermined acquired common channel retention period; and
transmission logic operable to transmit an indication of the allocated acquired common channel to the user equipment.

In one embodiment, the node further comprises:
interval determination logic operable to determine preselected uplink transmit time intervals for uplink transmission on the allocated acquired common channel and transmit an indication of the preselected uplink transmit time intervals to the user equipment. Those uplink transmit time intervals may comprise timeslots and the time interval period may be an access slot.

In one embodiment, the node further comprises: reassessment logic operable to reassess available common network resource within the predetermined acquired common channel retention period and if it is determined that the allocated common channel is no longer available to the user equipment for the predetermined acquired common channel retention period; to transmit an indication of unavailability of the allocated acquired common channel to the user equipment.

In one embodiment, the indication of unavailability comprises an indication of an alternative allocated acquired common channel.

Further particular and preferred aspects of the present invention are set out in the accompanying independent and dependent claims. Features of the dependent claims may be combined with features of the independent claims as appropriate, and in combinations other than those explicitly set out in the claims.

BRIEF DESCRIPTION OF THE DRAWINGS

Embodiments will now be described further with reference to the accompanying drawings in which:
FIG. 2 illustrates schematically signalling and method steps between a base station and user equipment according to one embodiment;
FIG. 3 illustrates schematically signalling and method steps between a base station and user equipment according to one embodiment;
FIG. 4 illustrates schematically signalling and method steps between a base station and user equipment according to one embodiment;
and
FIG. 5 illustrates schematically signalling and method steps between a base station and user equipment according to one embodiment.

DESCRIPTION OF THE EMBODIMENTS

Figure 1:
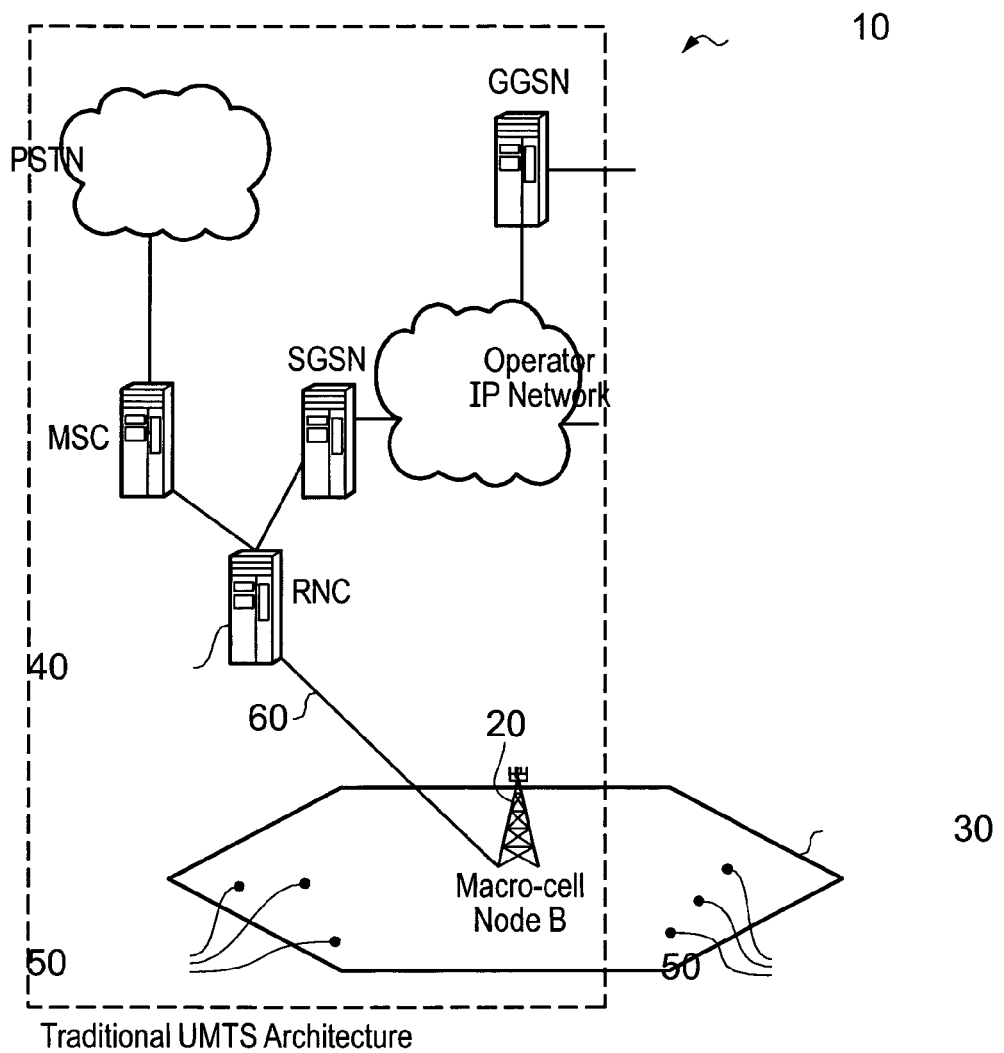
FIG. 1 illustrates the main components of a telecommunications network according to one embodiment.

FIG. 1 illustrates schematically the main components of a wireless telecommunications system 10 according to one embodiment. User equipment 50 roam through the wireless communications system. Base stations 20 are provided which support areas of radio coverage 30. A number of such base stations 20 are provided and are distributed geographically in order to provide a wide area of coverage to user equipment 50.

When user equipment is within an area served by a base station 30, communications may be established between the user equipment and the base station over associated radio links. Each base station typically supports a number of sectors within the geographical area of service 30.

Typically, a different antenna within a base station supports each associated sector. Each base station 20 has multiple antennas. It will be appreciated that FIG. 1 illustrates a small sub-set of a total number of user equipment and base stations that may be present in a typical communications system.

The wireless communications system is managed by a radio network controller (RNC) 40. The RNC 40 controls operation of the wireless telecommunications system by communicating with a plurality of base stations over a backhaul communications link 60. The RNC also communicates with user equipment 50 via each base station 20 and thus effectively manages a region of the entire wireless communications network 10. User equipment communicates with base stations 20 by transmitting data and information on channels known as uplink or reverse channels, and a base station 20 communicates with user equipment 50 by transmitting data and information on radio channels known as downlink or forward channels.

User equipment may operate in various modes in, for example, a UMTS telecommunications network. On initial turning on of user equipment in the cell, it will typically operate in "idle mode". Once it synchronises and attaches itself to a base station, it gains radio resource control (RRC) connection and is referred to as being in connected mode. User equipment in idle mode does not have a radio resource control connection. If user equipment is RRC connected it can be in one of five different RRC states: Cell_DCH, Cell_FACH, enhanced Cell_FACH, Cell_PCH, or URA_PCH states.

User equipment typically moves into Cell_DCH state when its data traffic is high. In a Cell_DCH state, the user equipment is allocated a dedicated channel on which to transmit and receive data from a base station. In a network operating according to typical UMTS architecture, user equipment can be in a Cell_DCH state when it is expected to have a high volume of traffic. Operation in a Cell_DCH state is typically highly demanding of battery power. User equipment may be operable, when not in a Cell_DCH state, to use a random access channel (RACH) on the uplink and a base station will operate to communicate with user equipment using a forward access channel (FACH). RACH and FACH have a small data carrying ability and in WCDMA or UMTS systems it is possible for user equipment and base stations to operate and communicate data traffic therebetween using shared or common resources on downlink and uplink when user equipment is operating in a Cell_FACH state.

In the uplink, such data traffic transmission occurs using an enhanced dedicated channel. In the downlink, it is sent on a high speed downlink shared channel. Such channels allow user equipment and base stations to communicate and to transmit longer and larger data packets between themselves for a time without the need for user equipment to upgrade to operating in a Cell_DCH RRC state. Such arrangements allow user equipment to remain in a Cell_FACH state for longer without transitioning to a more dedicated RRC state, thereby allowing a power consumption saving.

It will be appreciated that for data traffic which is particularly bursty in nature, operation in a full Cell_DCH state can be particularly wasteful of battery at user equipment and also of available radio resource. Thus, the ability to handle bursty traffic without entering a more dedicated state is beneficial to overall network operation.

The widespread popularity of "smartphones" in commercial networks has led to a change in typical data traffic profile carried within a network. The loading of Web pages and subsequent user reading, for example, has led to a data traffic profile which has become substantially discontinuous or bursty and traditional communication link establishment techniques and transfer techniques designed primarily for continuous data transmission may not offer a particularly efficient or prompt means to handle bursty traffic.

User equipment operating in a cell supported by a base station compete for common or shared channels. When operating in a Cell_FACH state, user equipment must compete with other user equipment in order to be allocated one of those limited number of shared channels.

Enhanced Cell_FACH has been introduced into UMTS and allows user equipment to receive high speed downlink packet access (HSUPA) packets. As a result, user equipment can receive large bursts of downlink data. High speed uplink packet access (HSUPA) has also been introduced to enhanced Cell_FACH, thereby enabling user equipment to send a large burst of uplink data. The bursty nature of smartphone traffic is suited to the enhanced Cell_FACH RRC state since it uses network resource more efficiently in comparison to use of a dedicated Cell_DCH RRC state. The number of smartphone devices is expected to increase significantly in the future and, thus, it is expected that more user equipment in a network will reside in an enhanced Cell_FACH state.

Some user equipment in a network may be capable of using a RACH (Random Access Channel) for uplink transmission. That is typically true for user equipment which are not operable to perform HSUPA in an enhanced Cell_FACH state. Other user equipment, having the ability to perform HSUPA in an enhanced Cell_FACH state, may be restricted so that they may only use common E-DCH channels to perform their uplink transmissions when in a non Cell_DCH state. As it is expected in the future for more user equipment to utilise the ability to transmit and receive bursty data using enhanced Cell_FACH, it is likely that the limited number of common E-DCH channels within a network will offer a restriction to network operation and that those shared channels may get congested during busy periods having heavy traffic within the network.

Some user equipment may be operable to operate in an enhanced Cell_FACH manner such that user equipment supporting HSUPA in an enhanced Cell_FACH state may be allowed to use RACH, thereby offering a chance to a base station to free up common E-DCH resources if the network is experiencing data traffic congestion on those resources.

If a user equipment using common E-DCH resource is released explicitly by a base station or node B, or implicitly released by a failure of a radio link, that user equipment may be left with residual RLC (Radio Link Control) packets formatted for transmission on an E-DCH channel in the user equipment buffer. Furthermore, there may be packets for HARQ retransmission at the user equipment. In the event that the user equipment is operable to fall back to transmit on a RACH channel, such residual packets will typically need to be regenerated to a format that can be used for RACH transmission. Such regeneration may lead to complexity of operation at user equipment. Furthermore, residual packets in a HARQ buffer may simply be lost. The user equipment may contain data in its buffer which is too large to be served in a single RACH channel. Embodiments and aspects described herein address some issues with such user equipment and aim to reduce complexity and issues in relation to residual packets and user equipment buffer status in the event of fall-back from use of an E-DCH resource to a RACH channel.

It is possible for user equipment to autonomously automatically fall back to operate on a RACH channel in the case of all CCH/DCCH logical channel transmissions. Rationale for such an arrangement would be that CCH and DCCH messages are typically small enough to be carried on a RACH channel. In the event that a system information broadcast is made which allows user equipment within a network to revert to operation which uses common E-DCH channels for transmission, the user equipment operating in RACH fall-back may be operable to then re-establish a link on a common E-DCH channel.

It will be appreciated that such an arrangement of autonomous automatic feedback at user equipment may have issues; in particular, some DCCH messages and CCCH messages may actually be too big to be carried on a RACH channel. By automatically and autonomously moving to use a RACH channel for transmission, RACH congestion may occur since the user equipment will typically be unaware of cell loading. In comparison to E-DCH channels, RACH channels typically have poorer link efficiency and, thus, for transfer of packets, use of E-DCH channels is likely to prove most efficient and ought to be used whenever possible. It will be appreciated that changes in a system information broadcast (SIB) occur at an RNC. Such high level messages are typically too slow to react to changes at a particular base station; for example, if a particular base station is heavily loaded. It will also be appreciated that user equipment is not continuously reading or monitoring for reception of a change in a system information broadcast and, thus, user equipment may take a while to notice a change propagated using a system information broadcast message. CCCH transmission is typically infrequent and, thus, does not allow immediate network congestion relief.

In some cases, it is possible to allow a base station to indicate to the user equipment a transport channel (for example, RACH or E-DCH channel) for use each time it wishes to communicate with the network. Such an arrangement may ensure that a base station has full control and ensures that full account is taken to possible changes in cell loading. However, since a base station is typically unaware of a user equipment's buffer status or the presence or otherwise of residual packets for E-DCH transmission, a fall back to RACH usage, as instructed by a base station, may result in poor performance overall if user equipment has a loaded buffer or must perform complex tasks to regenerate residual packets for transmission on an alternative channel.

Before particular embodiments of a solution are described, a general overview is provided. Aspects described allow the setting of a timer for user equipment to fall back to transmission using a RACH channel. During a timer period, user equipment may be operable to send a message using a RACH transport channel. Once the timer expires, RACH resource is released and the user equipment is not operable to fall back or send messages using the RACH transport channel. Such a method aims to ensure that user equipment has time to regenerate RLC packets if required. As a result, user equipment computational complexity may be reduced, since the regeneration need not necessarily occur in a time-critical manner. The user equipment, according to such a method, may be operable to decide not to use a RACH channel if it determines that RACH is unlikely to be a suitable transport channel for traffic in its buffer. For example, the user equipment buffer may be particularly large and filled, or user equipment may have residual packets which may not be successfully regenerated and, thus, utilisation of a RACH channel for transmission may prove unsuitable. In such a scenario, the user equipment may be operable to simply time out and not transmit anything until expiry of the timer and, thus, the RACH resource may be reused by other user equipment in a cell. The method also ensures that a base station is aware that a user equipment may be operable to have switched from transmission on an E-DCH channel to a RACH channel and, thus, the base station may be operable to expect a RACH transmission within a particular time period after cessation of transmissions on an E-DCH channel from user equipment.

FIG. 2 illustrates schematically signalling between a base station and user equipment according to one embodiment. As shown in FIG. 2, user equipment 50 is operable to send signalling to a base station 20. In the case illustrated in FIG. 2, that signalling takes the form of a preamble signal increasing in signal strength until that signal is successfully received at base station 20. When signalling 200 from user equipment is received at base station 20, the base station is operable to send a message to user equipment 50 on an AICH (Acquisition Indicator Channel). That AICH message 210 is sent to user equipment 50 and received at the user equipment. In this particular embodiment, a RACH fall-back timer, $T_{fall-back}$ is signalled to the user equipment via a broadcast or dedicated RRC signalling message. That is to say, user equipment operating in the network are informed that a RACH fall-back timer is to be used generally and its duration is also indicated to the user equipment. That fall-back timer is started at user equipment after it receives indication from a base station that it is to use, or fall back to using, a RACH channel for uplink.

FIG. 2 illustrates a particular embodiment and, in this case, after user equipment 50 sends its preamble signalling 200 it waits for a base station to respond with a message on an AICH. That message 210 is sent to user equipment once a base station has received the preamble signalling 210 from user equipment that has determined that a particular user equipment 50 could most sensibly use signalling on a RACH channel. The message 210 indicates to the user equipment that the base station 20 wishes the user equipment to fall back to operate on a RACH channel. The timer Trail-back is initiated at the base station 20 after the base station is operable to send the AICH message 210.

It will be appreciated that in other embodiments there are other means of sending a fall-back indicator than a message using an AICH.

The duration of the timer $T_{fall-back}$ balances user equipment response time and change to a propagation channel. It will be appreciated, for example, that the transmit power determined via preamble ramping may not be applicable by the time the timer expires.

If the timer implemented at base station 20 expires without the user equipment having transmitted anything to be received at a base station (that is to say, the user equipment has operated to decide not to transmit to a base station 20 using an allocated RACH channel since the information in its buffer is unsuitable), that user equipment may be operable according to some embodiments to back off for a particular time period before re-attempting network access. If a user equipment decides not to use RACH as instructed by a base station 20, then the traffic which the user equipment wishes to transmit is likely to only be able to be serviced by use of an appropriate E-DCH channel. Failure to obtain an E-DCH resource is essentially equivalent to a failed access attempt.

In one embodiment, the signalling sent to the user equipment may indicate one or more criteria which can allow or otherwise prevent user equipment being operable to use RACH for transmissions. For example, the network may indicate to user equipment what amount of data any buffer may act as a threshold to use of a RACH channel for uplink. In such embodiments, user equipment may only be operable to refuse to transmit packets using a RACH channel when the threshold is exceeded. If the user equipment has data in its buffer beneath the predetermined threshold indicated by the network, it is operable to use RACH for uplink transmissions.

According to one embodiment, user equipment may be operable to perform RACH transmission (transmission of RACH message part) only at predetermined specific time slots within the duration of fall-back timer $T_{fall-back}$. Such predetermined specific time slots may, according to such an embodiment, be selected relative to uplink access slots used by user equipment to transmit an up to date P RACH preamble.

In some embodiments, user equipment may be operable to perform RACH uplink transmission multiple times at predetermined time slots within the duration of fall-back timer $T_{fall-back}$. Such an arrangement may allow user equipment to send multiple short messages, for example of duration of 10 milliseconds or 20 milliseconds, within the duration of the RACH fall-back timer $T_{fall-back}$ without the need to perform a preamble procedure again to obtain access to a RACH channel.

It will be appreciated that a number of specific time slots within the duration of a $T_{fall-back}$ timer and an offset with respect to an uplink access slot typically used for P RACH preambles can be fixed for all user equipment in a cell, fixed for all user equipment in all cells, or it may be particularly configurable. If configurable, such parameters may be configured on a per cell basis through system information broadcast messages, or through dedicated layer 3 signalling if required to be configurable on user equipment by user equipment basis.

According to some embodiments, a base station may be operable to send a second indicator (for example, AICH message) which cancels an allowance to a user equipment to use a RACH channel for uplink. That indicator may be sent by a base station whilst a fall-back timer $T_{fall-back}$ is still running. Such an embodiment allows the method to recognise that cell loading at a base station can change and, thus, if an enhanced dedicated channel (an E-DCH channel) becomes available, a base station may be operable to indicate to user equipment that rather than use a RACH channel, an E-DCH resource could be used instead. It will be appreciated that a base station may also indicate, according to some embodiments, in an AICH or other indicative message the particular common resource channel that may be used by the user equipment. If a base station is operable to redirect user equipment to use E-DCH channels, the $T_{fall-back}$ timer is ceased since user equipment may use common E-DCH channels and resources directly without the need to wait.

A base station may be operable to send a further indicator; for example, an AICH, whilst the $T_{fall-back}$ timer is still running. That indicator may cancel the RACH fall-back and thus block user equipment from accessing the network. That is to say, the base station may be operable to send a NACK to user equipment 50 before the $T_{fall-back}$ timer expires. Such an arrangement may allow a base station scheduler to reallocate RACH resource to another user equipment. Reception at the user equipment of a NACK indicates to the user equipment that it is not able to send packets to a base station. Transmission by a base station of the second AICH message, including a NACK indicator, may stop the $T_{fall-back}$ timer.

If user equipment has received a negative acknowledgement in an AICH message it may be operable to perform a preamble procedure indicating to a network that it has data to send to the network. In some embodiments user equipment may thus be operable to initiate a timer on reception of a negative acknowledgement in an AICH and, for the duration of that timer, the user equipment may be restricted to perform preamble procedures only in respect of legacy P RACH resources. That is to say, a user equipment may be operable such that it cannot perform a full preamble procedure in order to try to obtain a common E-DCH shared resource until after a predetermined timer expires.

It will be appreciated that such an approach including a timer may also be applied to common E-DCH transmissions.

FIG. 3 illustrates schematically signalling and operation of a base station and user equipment according to one embodiment. In the example illustrated in FIG. 3, a user equipment 50 capable of RACH fall-back wishes to access the network. That user equipment 50 is operable to select a preamble signature from a designated preamble signature set. In the embodiment illustrated in FIG. 3, a set of preamble signatures is designated for those user equipment capable of operating according to a RACH fall-back procedure. As a result, a base station 20 receiving preamble signatures in relation to that set is operable to recognise at layer 1 that the user equipment requesting network resource on which to make an uplink transmission is capable of performing a RACH fall-back.

User equipment 50 is operable to perform a preamble ramping procedure 300 in order to determine an appropriate transmission power required for transmissions made by user equipment 50 to reach base station 20. Base station 20 detects 310 the user equipment preamble signature. That signalling received from the user equipment 50 indicates that the user equipment wishes to make use of a common E-DCH resource. The base station 20 determines that no common E-DCH resource is available for use. However, since an appropriate signature has been detected, the base station recognises that user equipment 50 is capable of utilising a RACH fall-back. If the base station determines that it has sufficient RACH resource, as is the case illustrated in FIG. 3, it is operable to transmit an AICH message 320 to user equipment 50. That AICH message includes an instruction to the user equipment to fall back and use a RACH transport channel for uplink transmission. On transmission of AICH message 320 the base station 20 is operable to initiate 330 a $T_{fall-back}$ timer.

The user equipment receives the AICH message from base station 20. In the scenario illustrated in FIG. 3, the user equipment buffer 50 contains a small packet to send. That packet may fit onto a single RACH channel. As a result, the user equipment format is operable to format its radio link control packet data unit (RLCPDU) for RACH transmission. Then user equipment is operable to transmit the packet via RACH within the duration of the fall-back timer initiated at base station 20. In this particular illustrated embodiment, the user equipment transmits its packet at a precise time slot in relation to uplink access slots used by user equipment for transmitting P RACH preambles. The precise time slot may be one of the many configured by higher network layers through system information broadcast within the serving cell. In this example, the user equipment is operable to send the necessary RACH message within a second time slot. Since the timer at base station 20 has not expired on reception of a RACH message from user equipment 50, that base station is operable to decode the RACH message. That is to say, the base station 20 is expecting a RACH message rather than messages on an E-DCH channel. It will be appreciated that according to some embodiments the user equipment 50 may be operable to send multiple RACH messages at precise time slots within the duration of a fall-back timer at base station 20.

FIG. 4 illustrates schematically signalling and operation of a base station and user equipment according to an embodiment. As in the example illustrated schematically in FIG. 3, user equipment 50 capable of RACH fall-back wishes to access the network. That user equipment 50 is operable to send a preamble 400 and that preamble is received at a base station. That reception at base station 410 indicates to the base station that the user equipment wishes to transmit data to the network on an E-DCH channel. Again, as in the scenario shown in FIG. 3, the base station does not have sufficient common E-DCH resource to serve user equipment 50. The base station 20 is thus operable to indicate in an AICH message that the user equipment is able to use RACH fall-back. Accordingly, the base station initiates a timer $T_{fall-back}$ and reserves a RACH resource for the user equipment 50. Initiation of the timer is shown as step 430 in FIG. 4. Transmission of the AICH message including an instruction to perform RACH fall-back is indicated as step 420 in FIG. 4 and reception of that message at the user equipment is indicated as step 440 in FIG. 4.

In this illustrated embodiment, user equipment 50 had previously been operable to transmit packets of data to the network using a common E-DCH. The user equipment 50 has residual packets in its buffer and those residual packets cannot be regenerated. In this case the user equipment has a large buffer of data and it is operable to determine that a single or multiple RACH transmissions are likely to be insufficient to serve that traffic. As a result, the user equipment illustrated in FIG. 4 is not able to benefit from being allocated a RACH resource and is operable to back off and try to access the network at a later point in the hope of getting allocation of a common E-DCH resource. In this case, the user equipment is operable to choose not to transmit anything despite being allocated RACH resource and initiates its back off after expiry of $T_{fall-back}$, as shown in FIG. 4. The step of re-initiating preamble procedure occurs after the time for 50 indicated in FIG. 4.

It will be understood that base station 20 fails to detect any RACH packets from user equipment 50 during the $T_{fall-back}$ period and, upon expiry of the timer, the base station is operable to release the RACH resource and that RACH resource may then be used by other user equipment in the cell.

FIG. 5 illustrates schematically signalling an operation between a base station and user equipment according to one embodiment. As in previous examples illustrated in FIGS. 3 and 4, user equipment 50 has data sent to the network and operates to try to access network resource. User equipment 50 initiates a preamble procedure 500 and base station 20 is operable to detect that user equipment preamble procedure. That detection occurs at stage 510 shown in FIG. 5. Again, the base station 20 determines that it does not have sufficient common E-DCH resource to serve user equipment 50 and indicates to the user equipment in an AICH message 520 received by the user equipment at step 540 that it does not have an E-DCH resource available and that RACH fall-back resource has been allocated to that user equipment. Both user equipment and base station initiate a fall-back timer of predetermined length, that fall-back timer is of duration $T_{fall-back}$ and is indicated as 560 in FIG. 5.

In the embodiment shown in FIG. 5, user equipment's buffer 50 includes a small packet to send to the network which can be fitted into one RACH channel. As a result, the user equipment performs a preamble procedure again, but this time it only uses legacy P RACH specific signatures. That preamble ramping procedure is shown as step 570 in FIG. 5. The user equipment 50 may not use common E-DCH specific signatures until expiry of the RACH fall-back timer 560. The base station receives the preamble messages for legacy P RACH and at point 580 in the scenario illustrated by FIG. 5 and is operable to return a positive acknowledgement for a legacy P RACH resource through the sending of an appropriate AICH message. That AICH message is indicated as 590 in FIG. 5 and is received by user equipment 50 at point 595. User equipment 50 is then operable to use the legacy P RACH resource to send a small packet which resides in its application buffer. In the case where the base station is sent a negative acknowledgement through its AICH message 580, the user equipment 50 would not be operable to send a preamble using common E-DCH specific signatures until expiry of the RACH fall-back timer 560. However, it would be operable to send multiple preambles using legacy P RACH signatures during the duration of that timer 560.

It will be appreciated that aspects and embodiments described herein allow user equipment which is able to fall back to operate using a RACH channel when ideally it would use an E-DCH channel will typically give such user equipment an opportunity to reconfigure its RLC PDUs and a chance for the user equipment not to use RACH resource when it is inappropriate to do so.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The functions of the various elements shown in the Figures, including any functional blocks labelled as "processors" or "logic", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" or "logic" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the Figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

The description and drawings merely illustrate the principles of the invention. It will thus be appreciated that those skilled in the art will be able to devise various arrangements that, although not explicitly described or shown herein, embody the principles of the invention. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The invention claimed is:

1. A method of controlling uplink transmission on an acquired common channel by user equipment in a wireless communications network, said method comprising:
    determining at said user equipment a selected acquired common channel retention period;
    requesting by said user equipment allocation of common network resource for an uplink transmission;
    receiving at said user equipment an indication of an allocated acquired common channel;
    assessing at said user equipment whether said uplink transmission meets uplink criteria for said allocated acquired common channel; and,
    transmitting by said user equipment said uplink transmission on said allocated acquired common channel within said common channel retention period determined by the user equipment where the uplink transmission meets the uplink criteria.

2. A method according to claim 1, wherein if said uplink criteria are not met, making no uplink transmission within the common channel retention period.

3. A method according to claim 1, wherein said common channel retention period is selected to be of a duration of more than one acquired common channel transmit time interval.

4. A method according to claim 1, further comprising:
    reformatting said uplink transmission during said common channel retention period for transmission on said acquired common channel.

5. A method according to claim 1, wherein requesting allocation of common network resource comprises requesting allocation of an E-DCH channel.

6. A method according to claim 1, wherein said acquired common retention channel comprises an allocated Random Access Channel (RACH).

7. A method according to claim 1, wherein said uplink criteria for said allocated acquired common channel comprises an indication of a threshold user equipment buffer size for said uplink transmission.

8. A method according to claim 1, further comprising:
    monitoring at said user equipment, during said common channel retention period, for an indication of unavailability of said allocated acquired common channel and, if received, making no uplink transmission on said allocated acquired common channel within said common channel retention period.

9. A method according to claim 1, wherein requesting allocation of common network resource for uplink transmission comprises indicating a preferred common network resource channel.

10. A method according to claim 1, further comprising:
    requesting allocation of common network resource for uplink transmission including an indication of a preferred common network resource channel during said common channel retention period if said uplink criteria are not met.

11. A non-transitory computer-readable medium storing program instructions that, when executed on a computer, cause a computer-controlled user equipment to perform the method of claim 1.

12. User equipment operable to control uplink transmission on an acquired common channel in a wireless communications network, said user equipment comprising:
    user equipment retention period determination logic operable to determine a selected acquired common channel retention period;
    resource request logic operable to request allocation of common network resource for an uplink transmission;
    reception logic operable to receive an indication of an, allocated acquired common channel; and
    transmission assessment logic operable to assess whether said uplink transmission meets uplink criteria for said allocated acquired common channel;
    wherein the transmission assessment logic is operable to transmit said uplink transmission on said allocated acquired common channel within said common channel retention period determined by the user equipment retention period logic where the uplink transmission meets the uplink criteria.

13. The user equipment according to claim 12, wherein the transmission assessment logic is operable to make no uplink transmission within the common channel retention period where the uplink transmission does not meet the uplink criteria.

14. The user equipment according to claim 12, wherein said common channel retention period is selected to be of a duration of more than one acquired common channel transmit time interval.

15. The user equipment according to claim 12, wherein the transmission assessment logic is operable to reformat the uplink transmission during the common channel retention period for transmission on the acquired common channel.

16. The user equipment according to claim 12, wherein the reception logic is operable to monitor for an indication of unavailability of the allocated acquired common channel during the common channel retention period;
    wherein the transmission assessment logic is operable to make no uplink transmission on the allocated acquired common channel within the common channel retention period where the reception logic received the indication of unavailability.

17. The user equipment according to claim 12, wherein the resource request logic is operable to request allocation of common network resource for uplink transmission including an indication of a preferred common network resource channel during the common channel retention period where the uplink transmission does not meet the uplink criteria.

18. A method of allocating a common channel for uplink transmission by user equipment in a wireless communications network, said method comprising:
    selecting at a network control node an acquired common channel retention period;

receiving at said network control node a request for allocation of common network resource for an uplink transmission by said user equipment;

assessing at said network control node available common network resource and allocating an available common channel to said user equipment for said selected acquired common channel retention period; and transmitting by said network control node an indication of said allocated acquired common channel to said user equipment;

wherein the user equipment is operable to determine the selected acquired common channel retention period, operable to assess whether the uplink transmission meets uplink criteria for the allocated acquired common channel, and operable to transmit the uplink transmission on the allocated acquired common channel within the common channel retention period determined by the user equipment where the uplink transmission meets the uplink criteria.

19. A non-transitory computer-readable medium storing program instructions that, when executed on a computer, cause a computer-controlled network control node to perform the method claim 18.

20. A network control node operable to allocate a common channel for uplink transmission to user equipment in a wireless communications network, said node comprising:

network control node retention period logic operable to select an acquired common channel retention period;

request logic operable to receive a request for allocation of common network resource for an uplink transmission by said user equipment;

resource assessment logic operable to assess available common network resource and allocate an available common channel to said user equipment for said selected acquired common channel retention period; and transmission logic operable to transmit an indication of said allocated acquired common channel to said user equipment;

wherein the user equipment is operable to determine the selected acquired common channel retention period, operable to assess whether the uplink transmission meets uplink criteria for the allocated acquired common channel, and operable to transmit the uplink transmission on the allocated acquired common channel within the common channel retention period determined by the user equipment where the uplink transmission meets the uplink criteria.

* * * * *